(12) United States Patent
Ricciulli

(10) Patent No.: US 7,584,303 B2
(45) Date of Patent: Sep. 1, 2009

(54) LOSSLESS, STATEFUL, REAL-TIME PATTERN MATCHING WITH DETERMINISTIC MEMORY RESOURCES

(75) Inventor: Livio Ricciulli, Los Gatos, CA (US)

(73) Assignee: Forte 10 Networks, Inc., San Jose, CA (US)

( * ) Notice: Subject to any disclaimer, the term of this patent is extended or adjusted under 35 U.S.C. 154(b) by 1022 days.

(21) Appl. No.: 10/742,284

(22) Filed: Dec. 19, 2003

(65) Prior Publication Data

US 2004/0174820 A1 Sep. 9, 2004

Related U.S. Application Data

(60) Provisional application No. 60/435,855, filed on Dec. 20, 2002, provisional application No. 60/462,118, filed on Apr. 9, 2003.

(51) Int. Cl.
*G06F 15/16* (2006.01)
(52) U.S. Cl. .................. 709/250; 709/223; 709/224; 709/225; 709/226; 709/231; 370/389; 370/392; 370/395.32
(58) Field of Classification Search ......... 709/223–226, 709/231; 370/389, 392, 395.32
See application file for complete search history.

(56) References Cited

U.S. PATENT DOCUMENTS 5,606,668 A   2/1997  Shwed

| | | | |
|---|---|---|---|
| 6,092,110 A | 7/2000 | Maria et al. | |
| 6,363,067 B1 | 3/2002 | Chung | |
| 6,510,509 B1 | 1/2003 | Chopra et al. | |
| 6,609,205 B1 | 8/2003 | Bernhard et al. | |
| 6,910,134 B1* | 6/2005 | Maher et al. | 726/24 |
| 6,925,085 B1* | 8/2005 | Krishna et al. | 370/395.32 |
| 6,954,789 B2* | 10/2005 | Dietz et al. | 709/224 |
| 2003/0014662 A1* | 1/2003 | Gupta et al. | 713/200 |

OTHER PUBLICATIONS

Livio Ricciulli, "Lossless, Stateful, Real-Time Pattern Matching with Deterministic Memory Resources," Mar. 15, 2003, pp. 1-5, Metanetworks Inc.
Livio Ricciulli, "A Data-Parallel Processor for High-Speed Signature Matching in Deserialized Bit Streams," Dec. 4, 2002, pp. 1-4, Metanetworks Inc.
Maya Gokhale et al., "Granidt: Towards Gigabit Rate Network Instrusion Detection Technology," FPL, 2002, pp. 404-413, LNCS 2438, Springer-Verlag Berlin Heidelberg, Germany.
International Search Report, Dec. 6, 2004, 5 pages.

* cited by examiner

*Primary Examiner*—Yves Dalencourt
(74) *Attorney, Agent, or Firm*—Robert Schuler

(57) ABSTRACT

In one embodiment, the method for inspecting packets comprises broadcasting data units of packets to a plurality of finite state machine (FSM) comparison units, where each of the FSM comparison units implements a portion of a signature. The method further includes comparing the data units of the packets to signatures, including each FSM comparison unit of the plurality of FSM comparison units independently comparing one of the data units to its associated portion of one signature. The method also includes combining results of the plurality of FSM comparison units independently processing the data units using a logic combinatorial circuit.

23 Claims, 10 Drawing Sheets

LOSSLESS, STATEFUL, REAL-TIME PATTERN MATCHING WITH DETERMINISTIC MEMORY RESOURCES

This application claims the benefit of U.S. Provisional Application No. 60/435,855 entitled "A DATA-PARALLEL PROCESSOR FOR HIGH-SPEED SIGNATURE MATCHING IN DESERIALIZED BIT STREAM," filed Dec. 20, 2002 and; U.S. Provisional Application No. 60/462,118 entitled "LOSSLESS, STATEFUL, REAL-TIME PATTERN MATCHING WITH DETERMINISTIC MEMORY RESOURCES," filed Apr. 9, 2003.

FIELD OF THE INVENTION

The present invention is related to an architecture and a hardware design for the high-speed inspection and filtration of network traffic.

BACKGROUND

The tremendous growth in both speed and reliability of today's optical networks has enabled the adoption of new communication paradigms that allow distributing human resources, databases, and operations across the entire globe. This revolution is dramatically increasing productivity and growth and laying down the foundations of future global societies.

As for any new revolutionary technology, this changing landscape also poses great threats to both our security and our new business processes. Emerging needs in network engineering, and network security require advanced monitoring of the data packets traveling through the networks. This monitoring is necessary to (1) form statistical models of the type of traffic utilizing the networks to aid in the design and optimization of the networks, (2) detect anomalous use of the network resources for improper attempts to violate access control policies and (3) gather intelligence on crime and national defense.

In addition to monitoring, defensive mechanisms are also necessary to quickly adapt and protect information systems to changing requirements or identified security threats. These needs go beyond the classic router and firewall functions of the OSI layers 3 and 4 and require deep packet inspection and classification policies based on any portion of the packet including its payload. These requirements are especially relevant for applying policies at the gateways between different administrative domains or in distribution centers where threats and instability can quickly spread among of 1000's of users.

The pace of increase of the communication speeds has created a lag in the ability of network monitoring devices to observe, categorize and analyze the traffic in real time. In particular, monitoring applications that require the analysis of the payload of the data packets are suffering today from limitation in performance that forces best-effort types of modality. This limitation prevents network operators from aggregating traffic streams for analysis and forces expensive and inaccurate monitoring solutions.

The enforcement of traffic filtering and rerouting policies are also affected by the increase in speed. Typically, conventional network computing power, originally designed for packet forwarding, is retrofitted and adapted to meet high-speed filtering requirements. This makes current defense mechanisms, inefficient, non-scalable and difficult to operate.

Current network processing technology is based on highly specialized microcontrollers designed to perform operations common to packet forwarding functions. These microcontrollers typically provide hardware support for (1) decomposing and reassembling packets, (2) look up tables for making routing decisions (typically achieved through the use of content addressable memory CAM), and (3) multithreading to be able to time-multiplex the processing of multiple packets.

Such microcontrollers have also been used to perform signature matching. Such an implementation is shown in FIG. 1. Referring to FIG. 1, a number of network processors 103 compare the incoming packets of data stream 104 to rules 102 stored in memory 101. Data stream 104 is load balanced across processors 103 in order to allow each processor enough time to compare the incoming data to rules 102 encoded into memory 101. The width of the input data path is typically fixed for each processor type and the synchronization of the matching operation is achieved with ad-hoc external circuitry. This architecture has the advantage of reusing and retrofitting existing network processing technology thus reducing cost but has considerable scalability constraints.

The problem with such current hardware-based signature matching implementations is both (1) an increase in the data stream input rate and (2) an increase in the number of signatures requires the addition of processors. This means that scaling can only occur with an increase in cost and synchronization overhead.

SUMMARY

A method and apparatus for inspecting packets is disclosed. In one embodiment, the method comprises broadcasting data units of packets to a plurality of finite state machine (FSM) comparison units, where each of the FSM comparison units implements a portion of a signature. The method further includes comparing the data units of the packets to signatures, including each FSM comparison unit of the plurality of FSM comparison units independently comparing one of the data units to its associated portion of one signature. The method also includes combining results of the plurality of FSM comparison units independently processing the data units using a logic combinatorial circuit.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

An Exemplary Architecture

Figure 1:
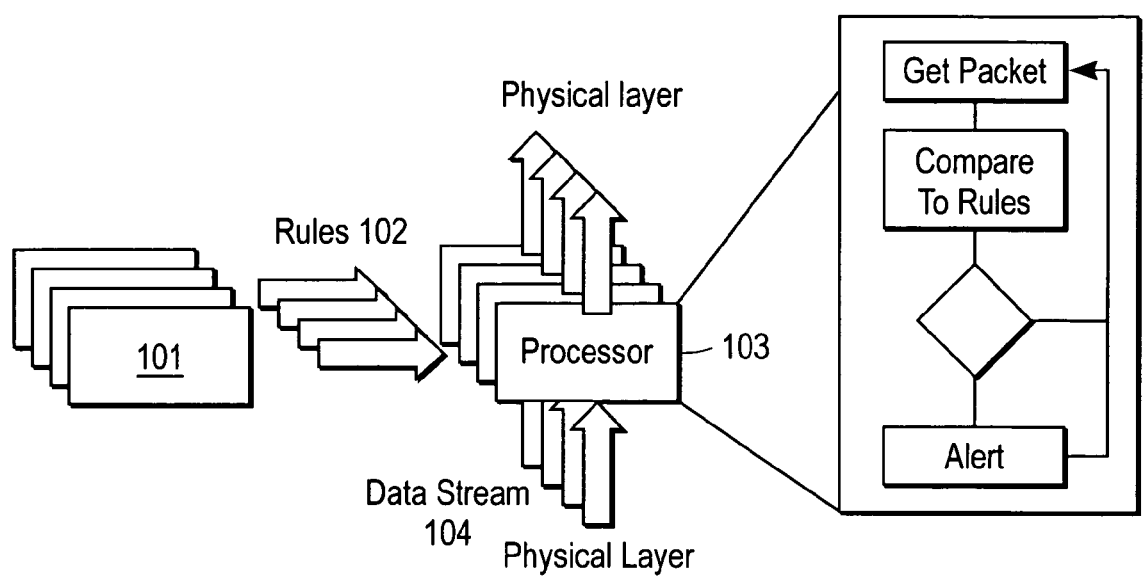
FIG. 1 illustrates a block diagram of a hardware-based signature matching implementation.
Figure 2:
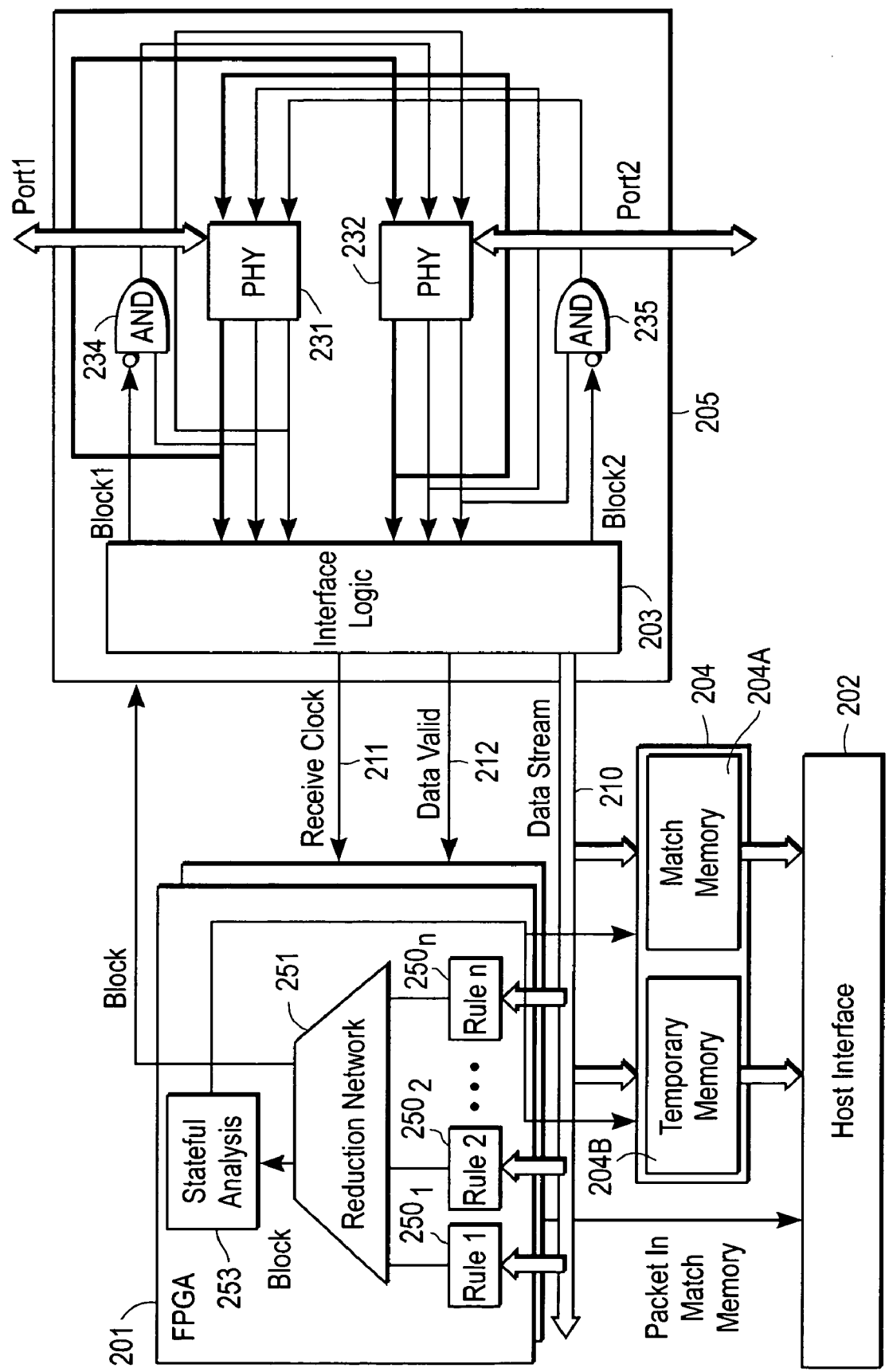
FIG. 2 illustrates a block diagram of one embodiment of a high-speed packet inspection architecture.

FIG. 2 is a block diagram of one embodiment of a high-speed packet inspection architecture. Referring to FIG. 2, the architecture comprises a layer-1 network interface module 205, interface logic 203, a host processor interface 202, electronic memory to store matched packets, referred to as memory 204, and a packet inspection module 201 having one or more packet inspection processors. The layer-1 network interface module and the packet inspection processors 201 will be described in more detail below, while interface logic 203, memory 204, and host interface 202 are well known in the art.

In one embodiment, network interface module 205 forwards full-duplex traffic between two ports, (2) enforces blocking signals to inhibit the forwarding in either of the two directions, and (3) presents (through the interface logic 203) the data being forwarded to packet inspection module 201. In one embodiment, network interface module 205 comprises a pair of physical layer interfaces (PHYs) 231 and 232 together, coupled to two ports, referred to as Port 1 and Port 2, and coupled to interface logic 203. In one embodiment, network interface module 205 also comprises logic 234 and 235 coupled to PHYs 231 and 232 and responsive to blocking signals, referred to as Block 1 and Block 2, respectively, to block transmission of packets. Using logic 234 and 235, the PHY responsible for transmitting a packet may be prevented from transmitting the packet in response to receiving a blocking signal. Similarly, using logic 234 and 235, the PHY responsible for receiving a packet may be prevented from transmitting the packet in response to receiving a blocking signal. Logic 234 and 235 may comprise AND gates. Note that the blocking signals may cause network interface module 205 to disable transmission or reception of a packet and/or replace the packet with invalid values. Network interface module 205 will be discussed in more detail below.

Interface logic module 203 is responsible for managing network interface module 205 and synchronizing packet inspection module 201 to the network data. In one embodiment, this synchronization includes the buffering of received data to match the width of the data bus of packet inspection module 201 and implement a synchronous bus from which one or multiple packet inspection processors can clock the data for analysis. In one embodiment, the data bus consists of the data stream 210, a bus clock signal 211 and a data valid signal 212. Using this simple bus design, one or more packet inspection devices of packet inspection module 201 can latch the input data from data stream 210 as long as data valid signal 212 is active. Interface logic module 203 is also responsible for translating blocking requests from one or more packet inspection processors to be enforced by network interface module 205.

Packet inspection module 201 is the core of the system and matches the input data stream 210 to a number of predefined signatures. In addition, packet inspection module 201 is responsible for controlling (1) memory 204, (2) alerting the host processor when new matches occur through an asynchronous interrupt (delivered through host processor interface 202) and (3) issuing blocking signals to network interface module 205. In one embodiment, packet inspection module 201 comprises packet inspection processors $250_1$-$250_n$ coupled to a reduction network 251 and a stateful analysis module 253. Reduction network 251 may comprise a logic combinatorial circuit. When a packet is matched, stateful analysis module 252 correlates the matched packets with previously matched packets and governs the storing of packets belonging to the same flow. Multiple packet inspection processors may be interconnected using standard multiprocessor design techniques, such as a wired OR, to parallelize the inspection of signatures using multiple physical devices without changing to techniques described herein.

Note that two packet inspection modules are shown. There can be one or more. These may be implemented using FPGAs. Alternatively, they may be implemented with ASICs or a combination of FPGAs and ASICs.

Memory 204 is responsible for recording traffic being received by the packet inspection processors of packet inspection module 201. Memory 204 is managed by packet inspection module 201 and can also be accessed by host interface 202 to allow the host to read the matched packets. Memory 204 comprises two distinct types of memories, match memory 204A and temporary memory 204B. Temporary memory 204B is used to hold packets that have partially matched and match memory 204A is used to store packets that constitute a match and should be further processed by a host processor.

Host interface 202 interfaces memory 204 to the host and also provides a way for a user to control the configuration of both the packet inspection module 201, interface logic 203, and host interface 202. In one embodiment, host interface 202 is implemented using technology well known in the art.

In one embodiment, host interface 202 signals a host processor that matched packets are available for further processing by the host processor. The signaling may be an interrupt-based mechanism that uses an interrupt to notify the operating system on the host processor that matching packets are available. The operating system includes a driver that accesses memory 204 and walk through the packets, which in one embodiment are part of a linked list. Thus, the driver reads the packets and provides them to the operating system. At that point, the operating system can discard the packets if they are not necessary (e.g., no one is listening) or can forward them to an application program running on the host. The application program may be, for example, a simple archiving program that records such packets or may be an intrusion detection system (IDS) that further analyzes the packets and may thereafter notify a user.

In one embodiment, the high-speed packet inspection architecture described herein, or a portion thereof, may be part of a network interface card (NIC) for using in a larger system (e.g., client or server systems).

High Speed Packet Inspection

Packet monitoring is most commonly achieved by specifying a number of packet signatures. These signatures are implemented in packet inspection module 201. Typically, each packet signature is composed of a list of token/value pairs. The tokens specify what portion of the packet to inspect (header fields, payload, CRC) and the associated values specify a value or a range of values constituting a partial match for that token. The list of token/value pairs constituting a signature is then implicitly logically ANDed to compute a match. If a packet is matched, it is typically archived or further processed by a monitoring application. The monitoring application is often running on a host processor.

In most cases only a very small fraction of the data stream is matched and handed over to the monitoring application. In one embodiment, to avoid this computational bottleneck, the packet inspection module compares each packet concurrently to all the signatures in real time. After this phase, the monitoring application only has to deal with relatively few packets.

In one embodiment, packet inspection module 201 includes hardware for the signature matching process, while leaving the monitoring application to analyze the matched packets. In one embodiment, packet inspection module 201 comprises one or more field programmable gate array (FPGA) and signatures are synthesized directly into logic circuits embedded in the FPGAs. This results in packet inspection module 201 being a hardware detection engine that is connected physically to the monitored network via a dedicated physical layer interface of network interface module 205. Packet inspection module 201 monitors the traffic at wire-speed (synchronously with the receive clock of the communication link), separating suspected attack packets from known good packets, and passing only attack packets to a software layer comprising the monitoring application, thus reducing the software's need to process every packet. The use of FPGAs enables rapid update of the logic and signatures so that packet inspection module 201 is no more difficult to update than any current software-based monitoring application. Note that ASICs may be used in place of FPGAs, or a combination of ASICs and FPGAs may be used.

The Data-parallel Processor Architecture

The data-parallel processing technique described herein offers definite advantages over conventional sequential processing in performing high-speed packet inspection. A serial bit stream representing packets originating from a network tap or a network mirror provided by network interface module 205 is first deserialized to a fixed word size. In one embodiment, the word size can be flexibly adapted from 8 to 256 bits depending on the requirements. These requirements may include maximum clock frequency of the processor and/or the limitation in the number of usable I/O pins to input the data stream into the processor. The input words obtained from the deserialization are broadcasted inside packet inspection module 201 allowing the matching of the deserialized words against multiple signatures to occur in a data-parallel way, thereby allowing a very large number of concurrent comparisons to be executed in parallel.

Figure 3A:
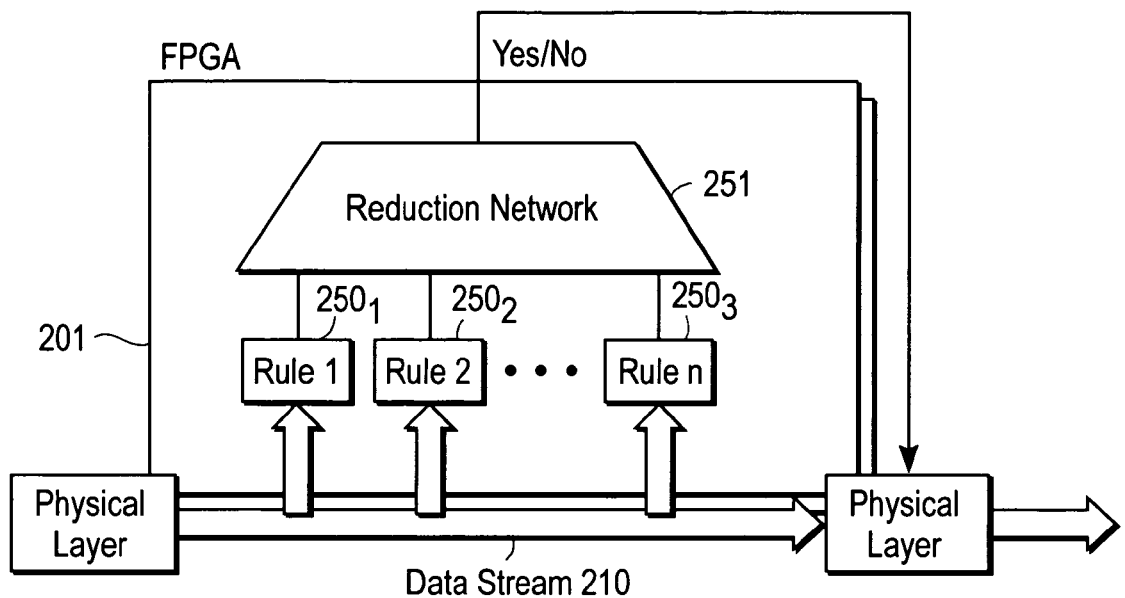
FIGS. 3A and 3B illustrate that the data stream is concurrently presented to a number of comparison units.
Figure 3B:
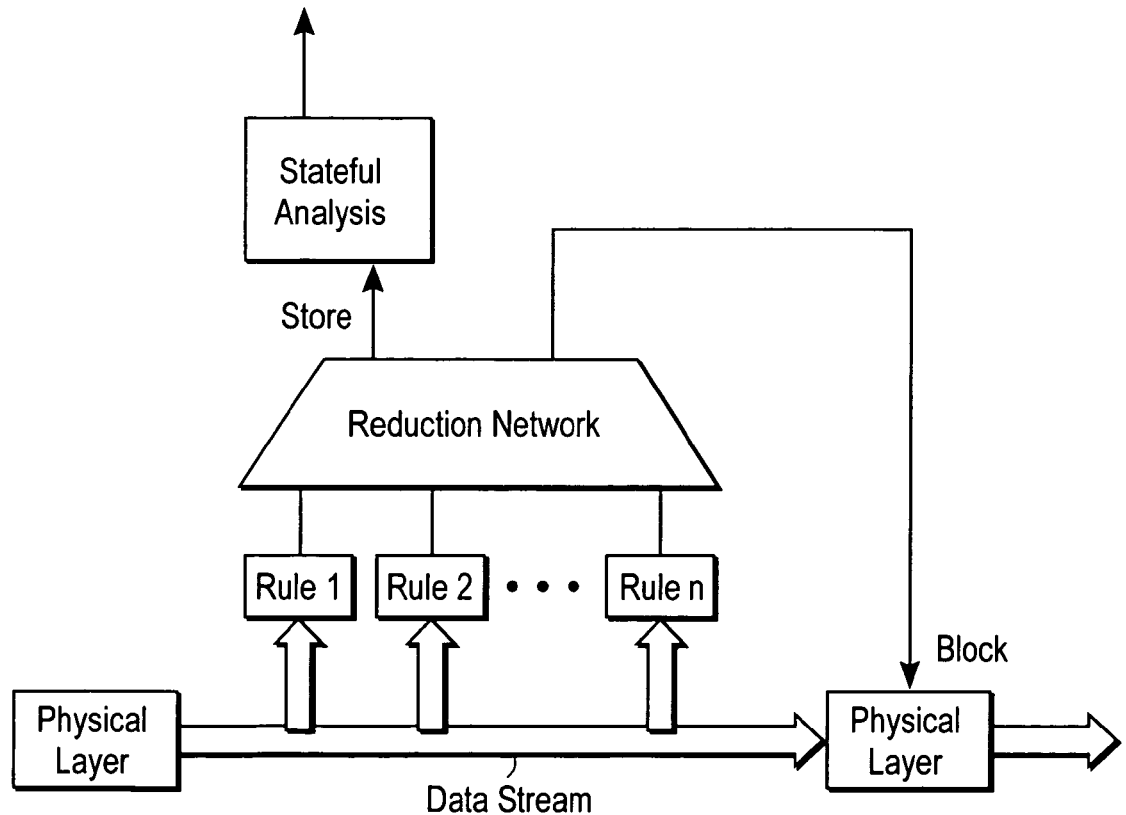

FIG. 3 illustrates data stream 210 being concurrently presented to a number of packet inspection processors $250_1$-$250_n$. Each of packet inspection processors $250_1$-$250_n$ operates as a comparison unit. Each comparison unit includes matching logic to match a specific rule and, at any time, can assert a true or false signal indicating whether a match occurred. Such a signal is then ORed, through a reduction network 251, with the outputs from the other comparison units. The output of reduction network 251 indicates if any of the comparison units have achieved a match.

This processing technology can scale in both (1) speed by employing larger deserialized words to balance faster serial links and (2) in the number of signatures by adding more matching logic to store the additional signatures. The additional matching logic may be gained through adding FPGAs or ASICs or by using a larger chip.

Deserializing the input stream to large words (to achieve higher speeds) does not add cost to the solution since it only involves widening the input bus without requiring additional hardware. Widening may affect only the amount of logic required to perform the matching functions but does not incur in any additional synchronization overhead.

The addition of comparison units (and their matching logic) to increase the number of signatures may require the additional cost of employing more matching hardware but only results in minimal synchronization overhead increase by virtue of the different computational model (the reduction network requires combinatorial logic proportional to the logarithm of the number of comparison units). This well-known property of data-parallel systems, therefore, allows cost-effective scaling to occur with the addition of multiple processors interconnected with simple combinatorial circuits. These simple combinatorial circuits may be part of the reduction network that combines the results from the reduction networks of each individual processor in a single board-level value.

Comparison Units

Each of the packet inspection processors of the packet inspection module includes a comparison unit with matching logic. At the core of our scalable matching technology is the ability to match a sequence of input words $W_1, W_2, W_3, \ldots W_n$ of size W against a number of pre-programmed signatures. In one embodiment, the words are presented to the comparison units sequentially and are either discarded after use, or temporarily written to electronic memory for later retrieval by a monitoring application or some other application running on a host.

All user-defined signatures are decomposed in words of size W (the same size of the input words). Each signature word has a Boolean value indicating a match or not a match on the current cycle. Each signature word also can be preprogrammed at the time of the synthesis of the match network to be 1) an initial word of a signature;
2) a middle word of a signature;
3) a unique word of a signature;
4) the last word of a signature; or
5) a word to occur at a specific offset from the start of the packet.

This organization allows sharing the matching of words that overlap multiple distinct signatures, thus reducing the amount of matching logic used.

Figure 4A:
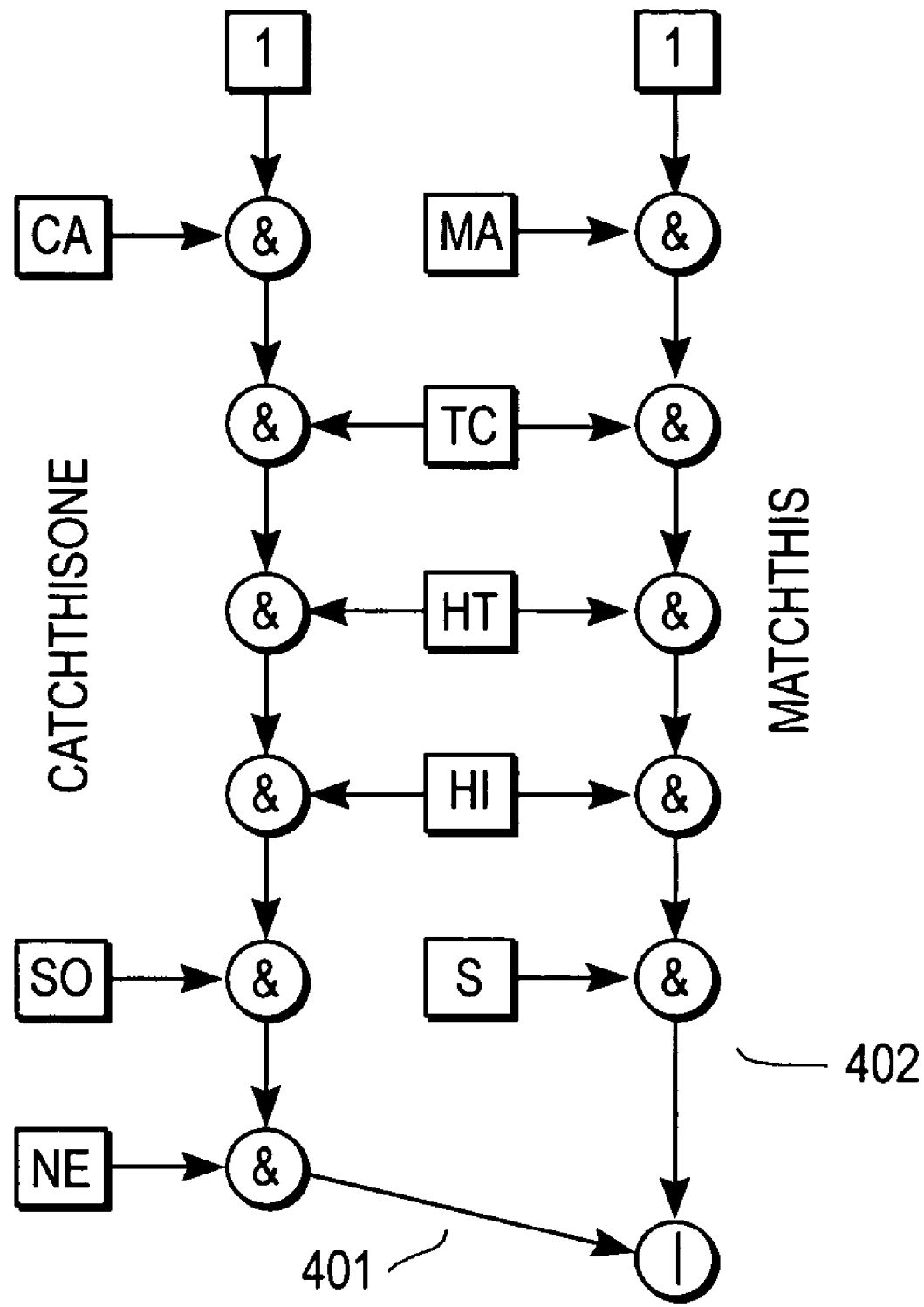
FIG. 4A illustrates an exemplary encoding to realize the matching of a pair of strings.

FIG. 4A shows an exemplary encoding to realize the matching of the string "MATCHTHIS" and "CATCHTHIS-ONE" using 16-bit words. Referring to FIG. 4A, two logic circuits 401 and 402 are shown. Logic circuits 401 and 402 compare portions (e.g., words) of the bit stream, which is shown input at 1, with data units (e.g., words) of a signature. Each word of a signature is logically ANDed with data units from the bit stream. Thus, the encoding allows sharing of the matching of the substring "TCHTHI" while providing two completely independent logic circuits.

Figure 4B:
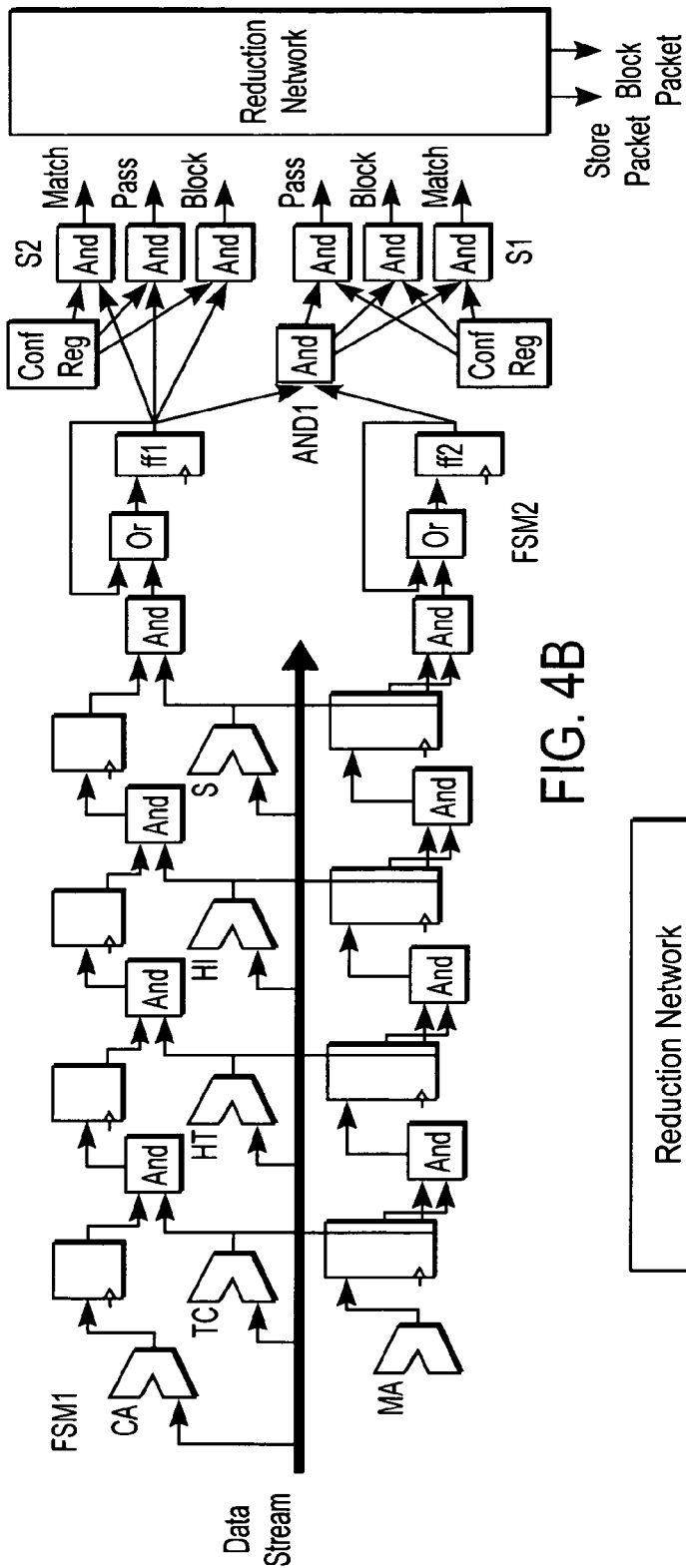
FIG. 4B is a block diagram of one embodiment of a pair of comparison units.

FIG. 4B shows how two strings sharing some similar patterns are matched. FSM1 compares the input words broadcasted by the data stream to the string "CATCHTHIS" and sets the value of the flipflop "ff1" to logical value 1 if the string is sequentially received. The comparators that overlap the matching of "MATCHTHIS" are reused by FSM2, which will set flipflop "ff2" to logical value 1 if this string is sequentially received.

Notice that "ff1" and "ff2" retain the logical value of 1 once a match occurs through the OR function that feedbacks the 1. When a new packet starts, these flipflops are reset to 0 (reset and clock networks are not shown for simplicity).

Note that comparison units may be shared not only for matching words that overlap multiple distinct signatures, but also for the same signature.

FIG. 4B also exemplifies how one embodiment of logic circuits and depicts how FSM1 and FSM2 are reused to implement two separate signatures. The AND function "and1" ANDs the values of "ff1" and "ff2" to result in matching a signature (S1 in the diagram) that has both strings "CATCHTHIS" and "MATCHTHIS" in the same packet. This signature is associated with its own configuration register, which in turn will generate "match", "pass" and "block" signals according to the configuration register. These signals are then input in the reduction network.

A packet containing solely CATCHTHIS would result in matching signature S2 (but not S1), and in association with a separate configuration registers, the values "match" "pass" and "block" would then be processed by the reduction network as for S1.

Figure 4C:
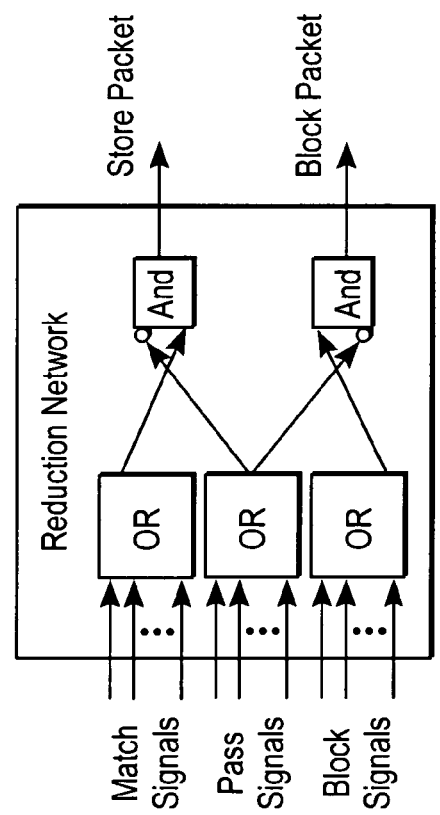
FIG. 4C is a block diagram of one embodiment of a reduction network.

FIG. 4C illustrates one embodiment of the reduction network. Referring to FIG. 4C, the reduction network ORs all the signals from all the signatures and at the same time implements blocking and/or storing of the packet unless one of the matching signatures was configured to yield a "pass" value.

Therefore, if S2 was configured to match and block and S1 was configured to pass, then 1) a packet containing both "CATCHTHIS" and "MATCHTHIS" would not be blocked or stored because S1 and S2 would both match but S1 would take precedence; and
2) a packet containing only "MATCHTHIS" would be blocked and stored since S1 would not match (because of the absence of "CATCHTHIS").

The configuration register associated with each signature stores two bits (bit1 and bit2) input at runtime or statically defined. Bit1 and bit2 are flags that indicate "pass" and "block" respectively. In one embodiment, the signals input into the reduction network are generated using the following equations.

Match=sm

Pass=sm^bit1

Block=sm^bit2^!bit1 where sm is the signal indicating that the signature matches.

Thus, each FSM matches a portion of a signature, where multiple FSMs ANDed together constitute a signature match, and such a signature match can be translated into a pass or block value depending on the configuration.

Figure 5:
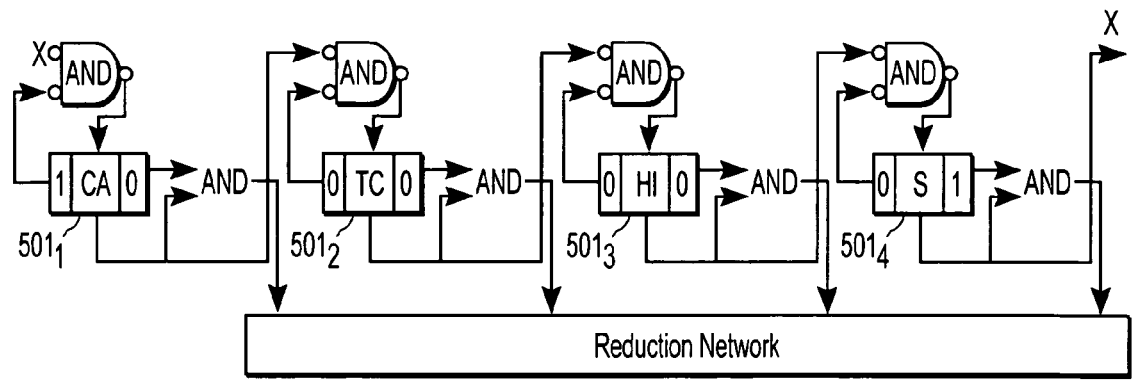
FIG. 5 illustrates one embodiment of a linear match network.

A device may be programmed to recognize a specific new signature without having time to optimize and reconfigure the network of matching logic in the comparison units to include the new signature. In such a case, a generic, predefined match networks arranged in a linear fashion may be used. FIG. 5 is a block diagram of one embodiment of a linear match network. Referring to FIG. 5, a number of programmable registers $501_1$-$501_4$ are arranged in linear list and programmed to match the string CATCHIS. Although only four programmable registers are shown, any number may be included. Each of registers $501_1$-$501_4$ can be programmed to (1) match a specific word of a signature, (2) conditionally use the output of the previous register and (3) be the last register of a signature match. Essentially, the programmable registers comprise multiple FSMs concatenated together to create the linear network, and each FSM of a signature depends on the previous FSM of the same signature, thereby implicitly ANDing all the FSMs together.

Referring to FIG. 5, the first programmable register in the linear list includes bits 1,0 that are used as inputs to AND gate logic. The second programmable registers in the middle of the linear list include bits 0,0 that are used as inputs to the same type of AND gate logic. The last programmable register in the list includes bits 0,1 that are used as inputs to the same type of AND gate logic. An output for one of the AND gates for each of the programmable registers is coupled to the reduction network; however, these outputs for the first three programmable registers in the list (all except the last one) are always zero (no). Only if the last programmable register matches indicates a match will the linear list be considered to have a match. (Note that X is a don't care value.)

Allocating a number of programmable registers and later programming the registers with appropriate values one can then add signatures to the system without modifying the topology. In one embodiment, these are programmed through the host interface module.

This linear network logic design is similar to the designs exemplified in FIG. 4B. The major differences between this and the logic design of FIG. 4B are that in this (1) the values to be compared are programmed into the registers at runtime through the host interface rather than synthesized directly into the logic circuit as constant, (2) two additional configuration bits are used to mark the beginning and the end of a matched string thus effectively programming the separate segments of the linear network where the separate segments each match a specific signature.

Unanchored Signature Match

Because the patterns identified by the signature words may be arbitrarily shifted and spread among two words w1 and w2, a two-step parallel matching process may be employed. A deserialized input word latched at time t w(t) and all signature words S of size W are decomposed in n octets.

Each S can specify a bit mask for specifying the match of a bit pattern within the sequence of signature words. Such a bit mask is then used during the matching phase for subpatterns that do not evenly divide by W, thus ignoring a number of bits within octets of w(t).

In one embodiment, for each w(t) that originates from the network interface and for each S in the system, the number of contiguous least significant matched octets (V1) and the number of contiguous most significant matched octets (V2) are recorded by the FSM into flip flops dedicated to unanchored string matching. For each incoming w(t) and each S, the FSM records:

V1(S,t) as one of 1, 2, 3, . . . n and

V2(S,t) as one of n−1, n−2, n−3 . . . 1

In one embodiment, this is implemented by comparing each octet of S to each octet of each w and combining the matches in such a way to record V1(S,t) and V2(S,t) into memory. At each time interval t, a match on S is indicated if:

$$V1(S,t-1)+V2(S,t-2)=n \text{ or } V1(S,t-1)=n$$

This logic enables matching of unanchored signatures while trading off comparison cycles for the amount of comparison logic.

The techniques described herein allow processing each deserialized word w concurrently on all signature words S matches constituting the match graph shown in FIGS. 4A or 4B. The intrinsic parallelism is given by the fact that as w is compared through the match graph, it is compared to all possible signatures encoded in the match graph.

Stateful Matching

In one embodiment, pattern matching is stateless across different signature expressions. This means that signatures do no depend on each other and the sequence of multiple matches does not influence the total outcome. Therefore, in stateless pattern matching, reordering of data units (packets) constituting the data stream still causes the same signatures to match (although in a different order) and produces the same final outcome.

Stateful matching enforces a time dependency between the matching events. With stateful pattern matching, it is possible to specify which matching event needs to occur at which time with respect to other matching events. In order to achieve this, it is necessary to store information (state) on which events occurred and use such information each time a new event occurs. Stateful matching improves the accuracy of detection because it adds ordering when specifying behaviors across multiple matching events.

As in many designs, one of the great challenges of stateful matching is to efficiently manage the matching information as it unfolds. It is often the case that there are limited resources to record the information and thus techniques are needed to reclaim stale resources for new matching events. In software systems, the garbage collection of state is performed by looking at the time and inferring that older state is not as useful as newer state and therefore can be deleted to make room for new information. This is possible since the garbage collection timeouts can be made to be in the same order of magnitude of the timeouts of the system being monitored (information that is stale to the stateful matching system is also un-influential to the monitored system and therefore can be garbage-collected).

An Exemplary Hardware-based Implementation

A challenge for hardware-based pattern matching is to provide statefulness. This challenge stems from the fact that hardware systems are less flexible than software systems in their ability to manage state. Because parallel hardware-based matching systems work synchronously without the aid of operating systems, they need to manage state in a simple and deterministic way. In addition to this design constraint (particular to hardware systems) all stateful matching systems (both software and hardware) require innovative state management techniques that can cope with a limited amount of resources while providing lossless stateful matching. Lossless stateful matching is defined as the absence of false negatives when processing a stateful pattern matching algorithm.

Figure 6:
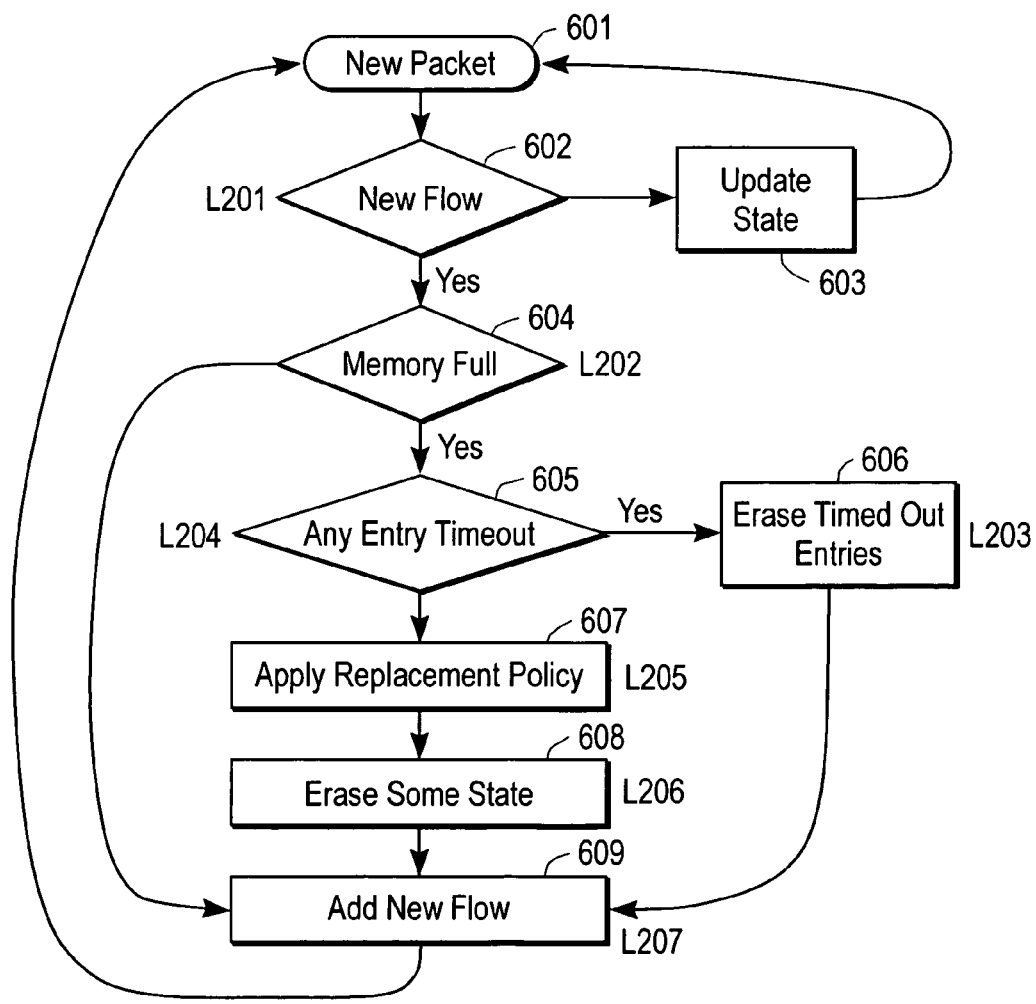
FIG. 6 is a flow diagram of one embodiment of a process for storing state.

FIG. 6 shows one process used by conventional memory management system to store state. This algorithm may be used in one embodiment. The system copes with exhaustion of the state memory using a replacement policy. The replacement policy essentially instructs the system to erase some of the existing state to make room for the newly arrived flow. Typical replacement policies employed are least recently used (LRU), or less frequently used (LFU) and try to minimize the overall impact of erasing information. Erasing information in a stateful packet matching system yields undesirable effects since it can lead to false negatives (the failed detection of a stateful pattern). Because of this, current stateful matching pattern systems dedicate large amounts of state memory to minimize this possibility. However, dedicating an amount of memory that grantees no false negativesis impractical and current systems are limited to a predefined number of concurrent flows.

Referring to FIG. 6, the process comprises receiving a new packet (processing block 601). Next, processing logic determines whether the packet is part of a new flow (processing block 602). If it is not, processing logic updates the state (processing block 603), and processing transitions back to processing block 601. If it is part of a new flow, processing logic determines whether memory is full (processing block 604). If memory is full, processing logic determines whether there is an entry timeout (processing block 605). If there is any entry timeout, processing logic erases the timeout entries (processing block 606) and transitions to processing block 609. However, if there is no entry timeout, processing logic transitions to processing block 607 where processing logic applies the replacement policy. Next, processing logic erases some state (processing block 608), and then transitions to processing block 609.

At processing block 609, processing logic adds a new flow and thereafter transitions to processing block 601.

In one alternative embodiment, another approach is used that allows a deterministic use of memory resources. This is because the state transitions in a stateful packet matching system are typically not arbitrary but, in the great majority of the cases, follow a non-cyclic pattern (with the exception of a transition to garbage-collect stale states).

Figure 7:
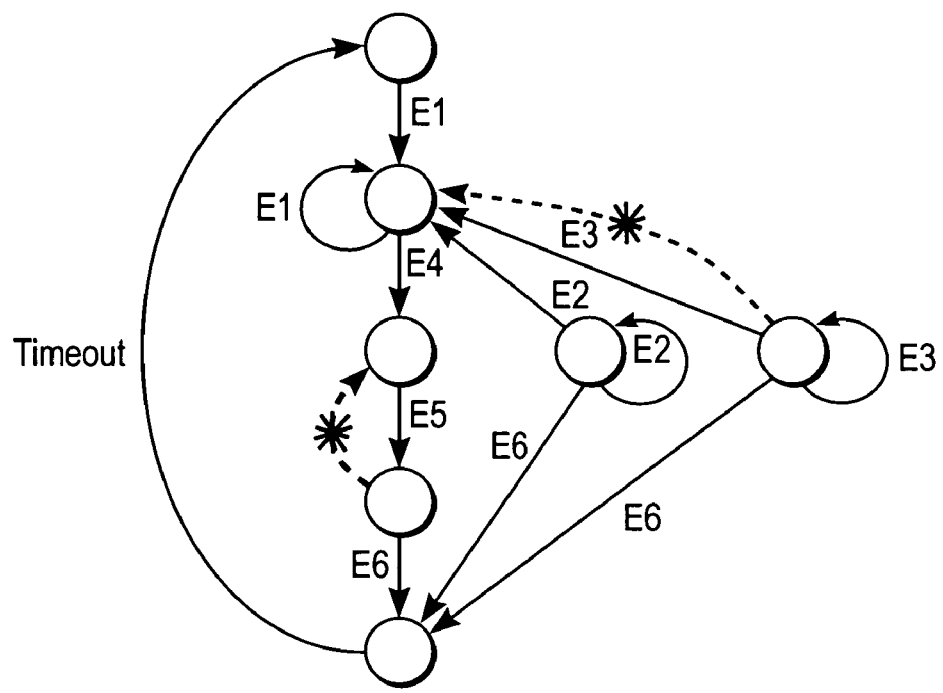
FIG. 7 illustrates a sample state transition system.

FIG. 7 shows a sample state transition system. The dashed state transition would establish a cyclic system and are not permitted (in this embodiment). This restriction on the state transition allows to greatly simplify the memory management system at the expense of expressiveness of the stateful matching design. However the number of stateful signatures requiring cyclic patterns is estimated to be very low.

Figure 8:
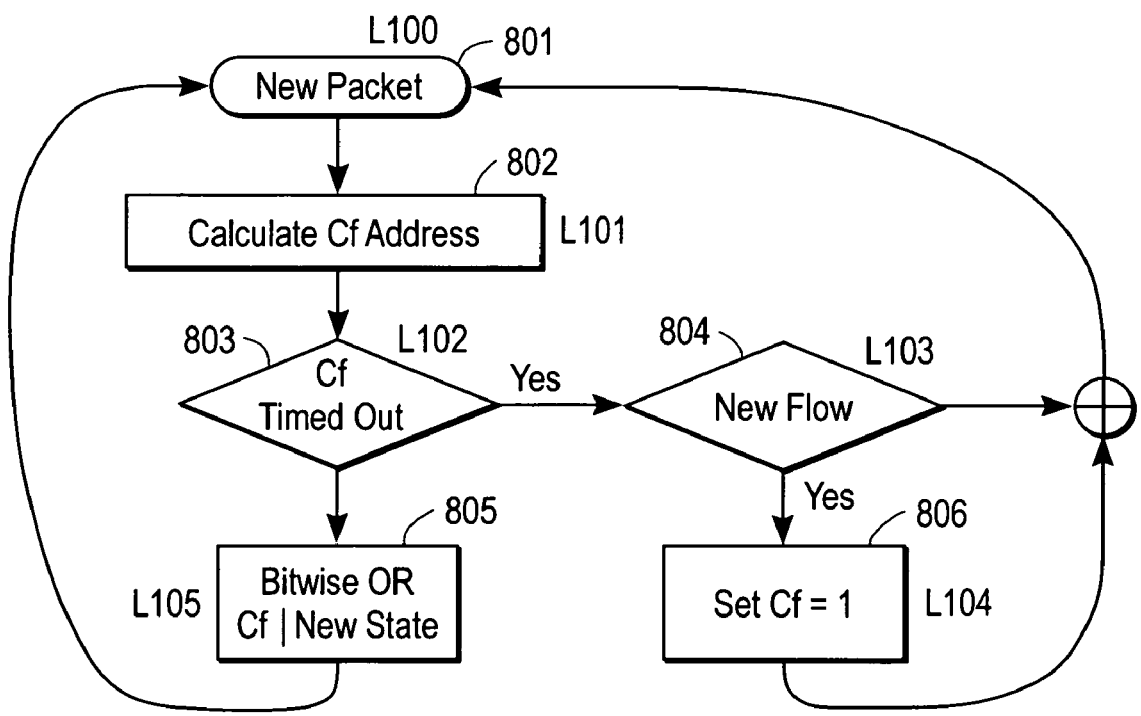
FIG. 8 is a flow diagram of a process for lossless state management.

FIG. 8 shows one embodiment of a state management process. Referring to FIG. 8, when a new packet is received the process of FIG. 8 is performed by processing logic which may comprise hardware (e.g., circuitry, dedicated logic), software (such as run on the general-purpose computer system or dedicated machine), or a combination of both. Referring to FIG. 8, when processing logic receives a new packet (processing block 801), processing logic calculates the address of the current state stored in register $C_f$ (processing block 802). Processing logic then tests whether the state in register $C_f$ is state (e.g., timed out) (processing block 803). If it is, processing logic tests whether this new packet is part of a new flow (processing block 804). If it is not, processing logic transitions back to processing block 801. If it is, processing logic transitions processing block 806 and sets the current state contained in register $C_f$ to one and then transitions to processing block 801. If the current state in register $C_f$ is not state (e.g., has not timed out), processing logic performs a bitwise logical OR operation ORing the current state contained in register $C_f$ with the new state and then transitions to processing block 801. Note that each of these processing blocks may be considered states such that FIG. 8 represents the state diagram.

Notice that the only time some state is erased is in a timeout case. New state transitions are simply recorded by performing a non-destructive, additive operation (bitwise or). This is possible since, by design, we never allow any state transition to erase any of the previous states (no cycles are allowed in our stateful system). As new states are produced, they are simply bitwise ORed (added) with the current states contained in $C_f$. These state values are stored in a dedicated state memory.

In one embodiment, the $C_f$ registers are managed using a hashing algorithm based on the source and destination addresses and ports. Hashing collisions may occur during the stateful inspection (e.g., while running through the algorithm of FIG. 8). Using the process depicted in FIG. 8, collisions can only result in additional matches rather than fewer matches. This is important because it allows the system not to ever lose matched data. If a collision occurs, both on the flow hashing and the pre-match bit pattern, and a pre-match pattern allows a signature to trigger, such signature may only add bits to the $C_f$ register (since the state transitions are non-cyclic). Adding bits cannot prevent the pre-match of other later signatures that share the same $C_f$ register. Collisions may therefore cause mis-activation of some of the signatures. However, the packets are sent to the host for further inspection and would be later discarded by the host. Because of both spatial and temporal locality, these misfiring occur in relatively small numbers, (e.g., 1% to 20% at 1 Gbps with 64 KB of memory) thus achieving hardware acceleration at no expense of accuracy of detection and only a small fraction (1% to 20%) of the CPU computation power. This scheme therefore allows the use of a deterministic state management algorithm while guaranteeing that no match events are ever lost due to resource constraints.

The amount of information passed to the conventional software system strictly depends on the amount of hardware resources dedicated to the state management. At one end of the spectrum, with no state memory, the technique described herein would pass nearly all events to the secondary system, thus bypassing the hardware system; at the other end of the spectrum with a very large amount of stateful memory, the technique described herein would pass to the secondary system only events that truly are anomalous in the strict sense, thus providing complete coverage and nullifying the requirement of the secondary software system.

In practice, the temporal and spatial locality of the event stream allows a system to achieve a large amount of hardware stateful operations with a relatively small amount of hardware resources. Such "acceleration" is common in other hardware-based systems such as computer "caches" or TLBs (translation look-aside buffer) buffers.

Therefore, the stateful, lossless, real-time pattern matching hardware system inexpensively accelerates the processing of high-speed data streams and offloads the great, great majority of the matches to conventional software-based systems.

An Exemplary Implementation

The mechanism is keyed on the data stream having a specific cardinal commonality that divides the data stream into a large but finite number of sub-streams (flows). In the case of an IP communication network, such a sub-stream is identified by source and destination addresses and ports in a manner well known in the art. (Note that such ports referred to herein are network ports and not the ports shown as part of the network interface module.) Thus, each packet with these same attributes is deemed to be in the same sub-stream.

The theoretical maximum number of flows is 2^96. To avoid having to reserve a unique memory location for each possible flow, a simple hashing method is used to map all possible flows into a finite set of addressable memory locations of the dedicated stateful match memory. Such a method consists in combining the source and destination addresses and source and destination ports into an address of the same size as the state management memory address M. This combining can be achieved in a number of ways using simple bitwise operations. For example, a hash address of size 20 can be produced as:

$A = srca[19:0] + dsta[19:0] + srcp[15:0] + dstp[15:0]$
modulo (2^20)

where srca[19:0] and dsta[19:0] are the least significant 20 bits of the source and destination addresses respectively and srcp[15:0] and dstp[15:0] are the complete source and destination ports. This operation requires a limited amount of hardware resources while it provides an adequate random distribution of the hash values.

Assuming the hashing value indeed provides a random distribution of hash addresses, the probability of collision (two flows concurrently use the same hash value) can be analytically modeled as:

$$P = (1 - 1/M)^{TR}$$

where P is the probability (0:1) that a specific flow will not collide with an existing flow, M is the modulo of the hashing value (20 in the example above), T is the average duration (in seconds) of a flow, and R is the rate of arrival of new flows.

Figure 9:
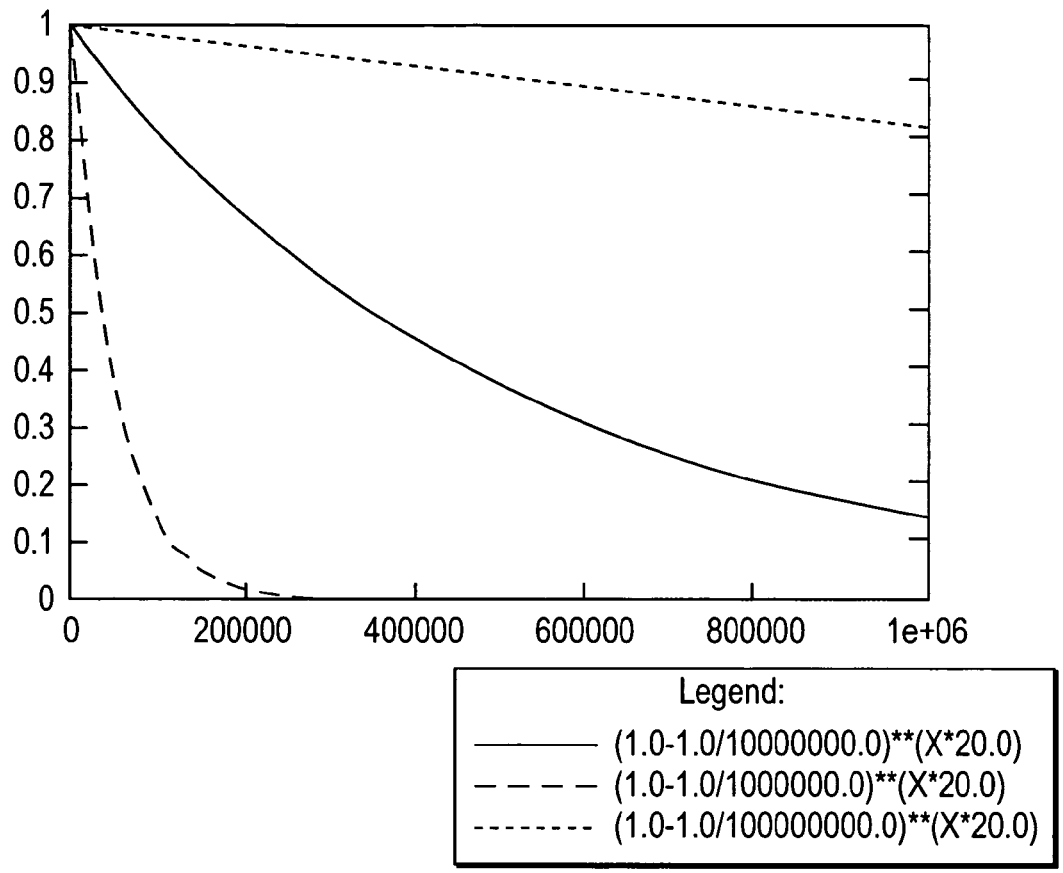
FIG. 9 illustrates the probabilities of collisions for a hashing modulo of 1M, 10M and 100M as a function of the input arrival rate of new flows given an average flow duration of 20 seconds.

FIG. 9 shows the probabilities of collisions for a hashing modulo of 1M, 10M and 100M as a function of the input arrival rate of new flows given an average flow duration of 20 seconds. Notice that for a modulo value of 1M, a flow arrival rate grater than 200,000 would result in a very low probability. The increase in the modulo would result in much fewer collision. For the 100M modulo the probability stays well above 80% even for extremely high flow arrival rates up to 1M flows per second.

Each signature i contains a pattern matching expression $m_i$ that is compared to the incoming data stream in real time (at time t). In addition, each signature contains three values (s, c, and r) which respectively specify (1) the pre-match condition necessary for the signature to match (in addition to $m_i$), (2) the post-match condition applied after the signature has matched, and (3) a directive indicating what to do with the matched packet.

In summary, the s and c values are used to manage a per-flow register $C_f$, where f is the flow (or sub-stream) and the r value is used to direct the packet storage.

The value in register $C_f$ is presented to all the signatures simultaneously during matching. Register $C_f$ has all the bits specified by $s_i$ (in addition to matching $m_i$) in order for the signature i to trigger. In other words, if the result of the logical AND of register $C_f$ with $s_i$ is non-zero and equal to $s_i$, the signature is allowed to trigger; otherwise the signature is not triggered. Therefore, value $s_i$ is referred to as the pre-match bit pattern.

The $c_i$ value is the post-match bit pattern defined by the signature i. If $m_i$ matches in the data stream and the pre-match condition is met, $c_i$ is logically OR-ed with the existing value in register $C_f$, and the result written back to $C_f$.

In general, for each signature i at time t $$\text{if}\{m_i \char`\^ (s^t_i \& C_f^{t-1}) = s^t_i\} cp^t_i = c_i \qquad \text{Eq 1}$$

$$\text{else}\{cp^t_i = 0\}$$

$$C_f^{t+1} = \Sigma cp^t_i \qquad \text{Eq 2}$$

where ^ is a logical AND operator and & is a bitwise AND operator. Equation 1 states that if there is a match $m_i$ and the pre-match condition holds, the post-match condition $cp_i$ is enabled. Equation 2 states that at each cycle the register $C_f$ is updated by the bitwise or of all the $cp_i$ values of all the signatures.

In one embodiment, a special pattern erases and rewrites the $C_f$ register if the last access to the $C_f$ register is older than a timeout value to indicate the end of useful state information. In one embodiment, any timeout value may be used. For example, sixty seconds is the usual timeout used to reclaim stateful data since it is the same timeout used by TCP endpoints. Alternatively, seventy seconds may be used.

The constant $r_i$ is a flag that tells the hardware what to do with a packet that has been matched to signature i. The memory used to store the matched packets is divided into temporary memory (204B) and match memory (204A). If a packet is stored in match memory 204A, action is requested from the host to process the matched packet. If a packet is stored in temporary memory 204B, no action is requested from the host as this represents only a partial match.

When a packet is stored in either temporary memory 204B or match memory 204A, a pointer to the previously stored packet in the same flow is also stored. Thus, a packet stored in match memory 204A may reference another packet stored in temporary memory 204A, which in turn may reference more packets, thus forming a linked list of partial matches starting with a packet stored in match memory 204A.

The values for $r_i$ have the following meanings:
0—do nothing,
1—store the packet in temporary memory 204B,
2—store the packet in match memory 204A and notify host software.

Figure 10:
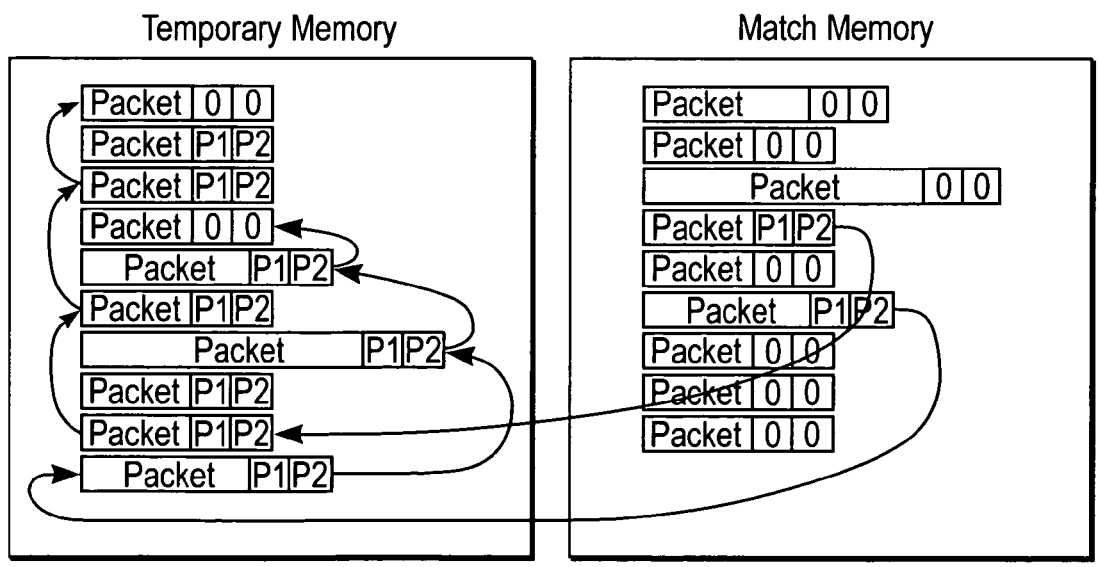
FIG. 10 illustrates the use of linked lists in temporary and match memory.

FIG. 10 illustrates this concept. Referring to FIG. 10, all packets are stored with two trailing pointers in either match memory 204A or temporary memory 204B. The first pointer points to the beginning of the next packet in the linked list and the second pointer refers to the end of the next packet in the linked list. This performance-enhancing double pointing technique is used to avoid "walking" the packet at runtime to find either the end or the beginning.

Packets with at least one null pointer (value 0) are considered to be the end of the list. Some of the packets stored in match memory have null pointers and some have valid pointers values to temporary memory 204B. Packets in match memory 204A with null pointers are single packets and are presented to the host directly (via host interface 202). Packets in match memory 204A with valid pointers cause the host to walk a linked list placed in temporary memory 204B. This list is terminated by a packet with at least one null pointer. Such null pointer packet constitutes the beginning of the linked list of packets to be presented to the host.

In one embodiment, the linked list includes a first element and a last element, which are packets that match to one of the signatures.

In one embodiment, the linked list is limited to a predetermined size. The predetermined size may be a number of packets or portions of packets or an absolute number of total bytes. In one embodiment, the predetermined size is equal to a number of bytes plus the number of bytes associated with a signature prior to a match being identified. Since the FSM comparison unit is responsible for storing packets in memory, once the limit is reached, the FSM comparison unit does not add any more packets to the linked list and these packets are lost. Note also that the FSM comparison unit terminates the linked list upon storage of a packet identified as a match to one of the signatures.

One optimization is to walk the linked list backward while recording the beginning of the packets in the list. Once the beginning of the list is reached, all packets are presented to the host by dereferencing the stored pointers in the reverse order. Thus, one or more packets to be blocked are presented to the operation system in the same order or in a different order than the order in which they were transmitted.

Structural Description of the Implementation

Figure 11:
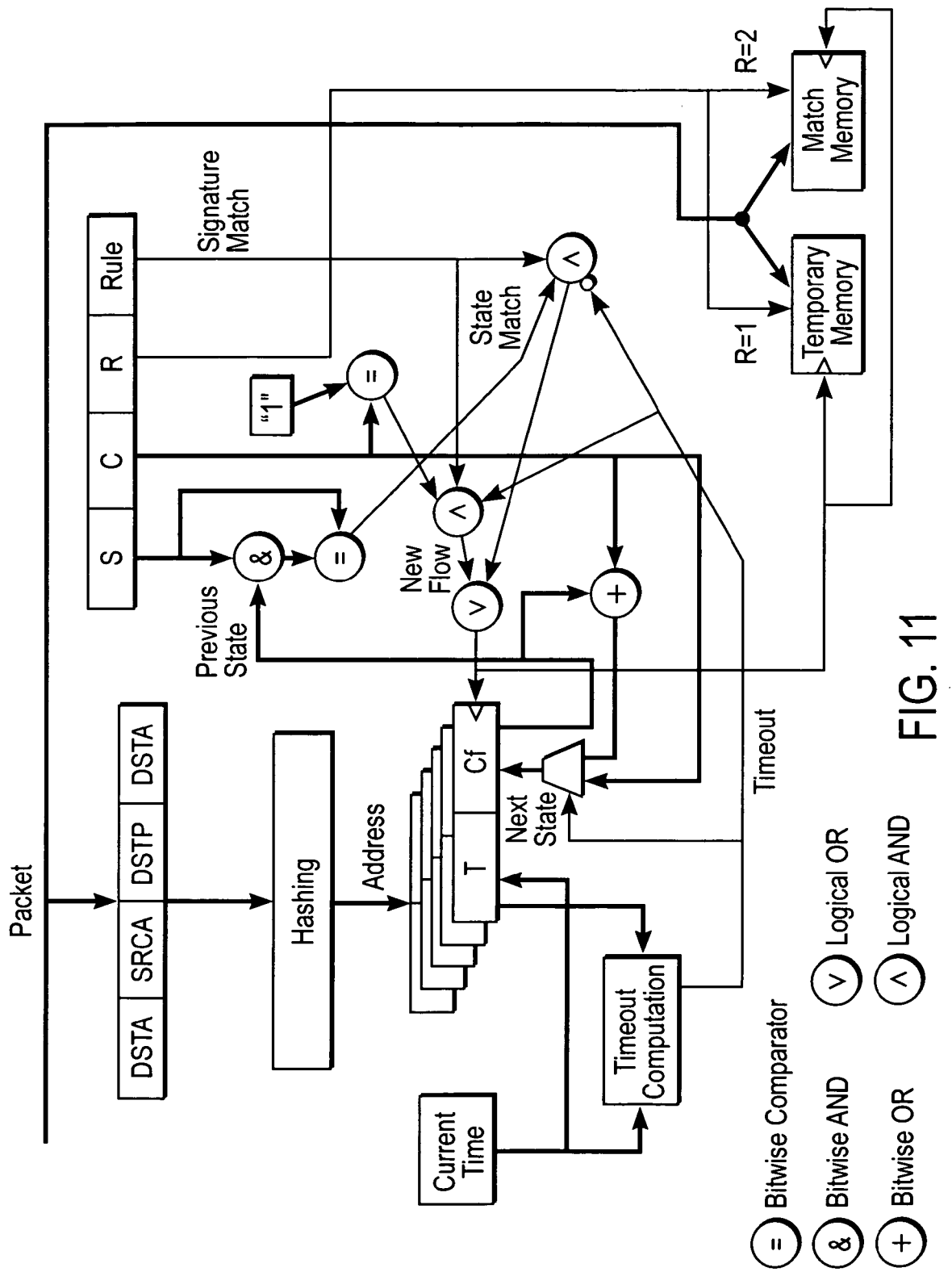
FIG. 11 is a block diagram of one embodiment of a signature matching architecture hardware design.

FIG. 11 is a block diagram of one embodiment of the hardware design. The packet is processed to extract a hash value of the source/destination addresses and ports. Such address is used to access the corresponding $C_f$ register and the associated timestamp.

A timeout condition occurs if the current time value minus the timestamp of the $C_f$ register results in a value greater than a predefined threshold (typically 1-60 seconds).

A rule match condition occurs if the incoming packet matches one of the signatures. If such event occurs the associated $S_i$, $C_i$, and $R_i$ values are used to compute the signals described below. If multiple rules match concurrently, the bitwise OR value of all the $S_i$, $C_i$ values associated with each of the matching rules are used instead. To simplify this narrative, we assume that the $S_i$, $C_i$ values can equally refer to single rule matches or multiple rule matches. The $R_i$ value of multiple rule matches is calculated by taking the maximum of all the R values. Therefore, storage to match memory 204A (R=2) takes precedence over storage to temporary storage 204B (R=1), which, in turn, takes precedence over no storage (R=0).

A state match condition occurs if the $C_f$ register contains the necessary bits for the pre-match condition ($S_i \hat{} C_f = S_i | S_i <> 0$).

A new flow condition is achieved if (1) a timeout occurs and (2) the current $C_i$ value is equal to "1" (bit 0 is the only bit set in $C_i$), and (3) the rule match condition occurs. The new flow condition, therefore, achieves the restart of the $C_f$ value to "1" after $C_f$ has expired.

A flow match condition is achieved if (1) the $C_f$ register is not in timeout and (2) there is a state match condition (3) the rule match condition occurs. The flow match condition signifies that this packet has met the stateful preconditions (encoded in $S_i$) and results in a stateful match. As a result, the register $C_f$ is updated by adding the post-match condition $C_i$.

Notice that both the timestamp and the $C_f$ register are updated if either (1) a new flow or (2) a flow match condition occurs. The next state value is the result of selecting the restart value "1" or the postmatch condition dictated by $C_i$.

The $R_i$ value determines what to do with the packets that match. If R==1, then the packet is stored in temporary memory for later retrieval; if R==2, then the packet is stored in match memory for immediate processing.

Referring to FIG. 11, from the packet, the destination address (DSTA) and the source address (SRCA), along with the two session ports are input to the hashing function, such as the hashing function described above, and the hashing function generates an address. The address is for a register that stores the stateful information (i.e., a stateful register) that represents the state of the flow and is going to be processed.

There are three values associated with each rule, namely S, C and R. S is the precondition, and C is the post condition, which means that S indicates whether this packet is in the particular state needed to be able to go to the next state. The precondition is calculated by ANDing the value of the state register $C_f$ with the S value and then if those two are equal, there is a state match. A state match means that there are enough bits in the state to indicate that the precondition is successful, and the state machine can continue to transition.

Note that as soon as the register is addressed, the timeout computation is performed using the current time to determine if the state information in the register is valid. If there has been a time out, then the packet has arrived too late. The time out indicates that the data in the state register is invalid or not, and if invalid, the state is deleted. The result of the time out is also that the match fails and may not be forwarded to the host processor. The packet then becomes part of a new flow.

Depending on whether the state is valid or not, the multiplexor coupled to the state register $C_f$ is going to update the register to put it in a new state or initialize it to a know initial state. Thus, the mux indicates whether the state should be a new state. The two inputs to the multiplexor are the old state in the register $C_f$ ORed with the new state C or just the new state C (without the bitwise ORing with the previous state), which is the state after the packet arrives. Thus, when the old state is overridden, the new state includes the old state (since it is a bitwise OR operation). Therefore, no state is lost and the process is stateful.

If there is a timeout, the only way that you can rewrite the register with an initial value is if the next state is a 1. If the next state is a 1, then a new flow is started. This causes a new flow signal to be generated. The new flow signal or a time out indication enables the writing of the state register $C_f$ (e.g., the write signal is enabled). Thus, the new value is written in the $C_f$ register if it is a new flow or if it is not a new flow but state matching has been successful.

The R value indicates into which memory to store the packet. If R equals 0, then the packet is not stored, and only changes to the stateful register are made. In such a case, the storing of the packets isn't desired, but may making a transition in state is. If R equals 1, packets are stored in temporary memory, while if R equals 2, the packets are stored in match memory. The writing of packets occurs when the write enable signal is asserted.

An example with exemplary signatures given below will be discussed.

1. alert tcp any any->any any (msg:"SYN"; flags:S; S:1; R:0; C:3;)
2. alert tcp any any->any any (msg:"ack"; flags:A+; S:2; R:1; C:4;)
3. alert tcp any any->any any (msg:"ack"; flags:A+; S:4; R:2; C:4;)
4. alert tcp any any->any any (msg:"frag"; dsize: 0<>100; S:1; R:1; C:9;)
5. alert tcp any any->any any (msg:"frag"; dsize: 0<>100; S:8; R:1; C:16;)
6. alert tcp any any->any any (msg:"frag"; dsize: 0<>100; S:16; R:2; C:16;)

Signature 1 matches any TCP SYN packet, erasing any pre-existing $C_f$ register that had expired; if this signatures triggers (a SYN is present), it will set bits 0 and 1 (value 3) in the $C_f$ register. The SYN packets will be discarded (R=0).

Signature 2 will trigger if Signature 1 has triggered (the $C_f$ register having bit 1 set) and the packet contains an ACK bit. The result for this match is to set bit 2 (value 4) in the $C_f$ register. The packet will be stored in temporary memory 204B (R=1).

Signature 3 will trigger if Signature 2 has triggered (the $C_f$ register having bit 2 (value 4) set) and the packet contains an ACK bit. The result for this match does not modify the existing content of the $C_f$ register. The packet will be stored in match memory 204A referencing the packet of Signature 2 for optional processing by the host.

The reader can inspect Signature 4, 5, and 6 and verify that they trigger a match and places a packet in match memory 204A (thus alerting the host) if three consecutive packets are seen with size between 0 and 100 (dsize: 0<>100). The third packet references the previous two stored in temporary memory 204B. Notice that the bit pattern used avoids collision with the previous rule.

High-speed Filtering

In one embodiment the network interface is part of a specialized network interface card having two network ports and a host connection. The network card is placed in series with a network link by offering compatible physical layer ports to the ports of the original network link. This, therefore, allows the network interface card to be inserted between the ports of an existing link without requiring changes to the ports (much like a firewall). The card can be programmed to recognize a number of signatures (specific sequences of bits in the traffic stream). The packets matching the signatures can be directed to be forwarded to a monitoring application through a bus connection to the host and/or be forwarded (pass) or not forwarded (block) between the physical layer ports. The packets not matching any of the signatures are forwarded between the two physical layer ports. In one embodiment, during matching, several rules may match a single packet simultaneously. In such a case, the passing rules are given precedence over blocking rules.

In deployments wanting to block out harmful packets (like a firewall), typically, the rules would direct the interface card to block matched packets. In this manner, one can keep out unwanted traffic. Because passing rules are given precedence over blocking rules (as in standard access control lists common to other filtering systems such as routers or firewalls), one can also create generic blocking rules and more specific passing rules for the purpose of forwarding through the physical layer ports only the packets matching the specific pass rules. This can be used to filter out uninteresting packets in deployments where it is useful to mirror traffic and redistribute only specific subsets of packets for further analysis by other downstream systems.

In one embodiment, the forwarding system (1) does not require layer 2-7 processing and (2) can be used to block packets. That is, the network interface comprises a physical layer interface without layer-2 and layer-3 processing.

In one embodiment, typical physical layer interfaces (PHYs) are implemented using specialized digital signal processor integrated circuits capable of translating analog signals traveling through the communication medium (copper or fiber optics) to and from standard digital signals (LVTTL or LVDS, for example). The digital side of the PHY is typically amenable to connection to other digital devices (typically an IC implementing the layer-2 MAC protocol). Such a digital interface usually has the dual purpose of allow transmission and reception of digital data. Data-valid and transmit enable signals (together with error indication signals) are used to synchronize the reception and transmission of the digital data. In other words, the PHYs ICs operate as the analog-to-digital converters of the communication stack.

In one embodiment, a simple digital circuit is interposed between two PHYs in order to forward the digital signals across the two PHYs. This circuit receives digital signals from one PHY and directly transmits them to the other PHY unchanged, thus creating a layer-1 forwarding engine. The data being forwarded between the PHYs may also be transmitted to another system through an additional bus for analyzing the data being forwarded. One innovation is to further add gating signals to the layer-1 forwarding engine that can halt the forwarding.

Figure 12:
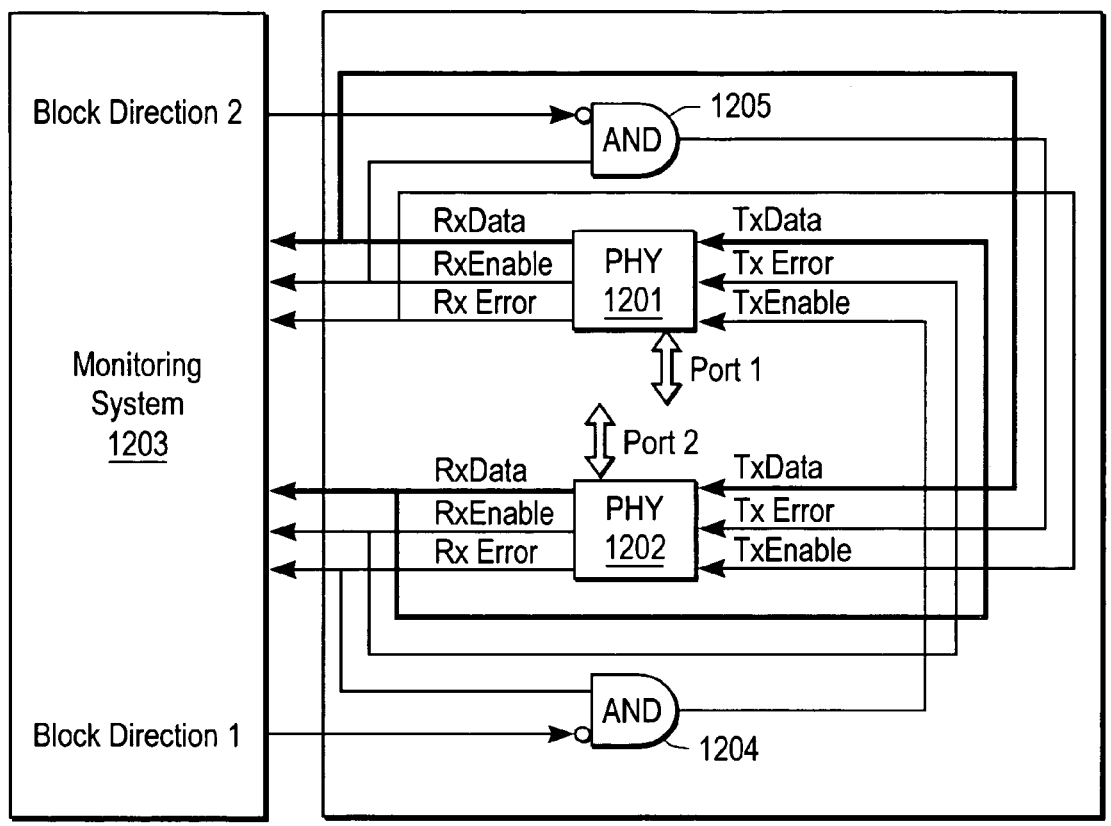
FIG. 12 shows one embodiment of a layer-1 network interface module.

FIG. 12 shows one embodiment of a network interface. Referring to FIG. 12, PHYs 1201 and 1202 are tied back to back and normally forward packets received from one analog interface (Port1 or Port2) through the other PHY to the other analog interface. While forwarding, PHYs 1201 and 1202 also provide the data to a monitoring system 1203 (which is shown in FIG. 2), and can accept commands to stop forwarding the data through the "AND" functional blocks 1204 and 1205. In some cases, it may be necessary to synchronize the reception and transmission of the digital data by buffering the signals in appropriate buffers and implementing clock domain change circuitry. Such standard buffering and clock management circuitry is not shown in FIG. 12 for simplicity and is implemented using well known prior art techniques. In any case, whether buffering and clock domain changes are used or not, the digital data and consequently the physical signals can be passed from one port to the other unchanged.

The significance of this embodiment is that it allows the construction of extremely low-latency and inexpensive filtering systems. It avoids the use and the associated latency and cost of MAC ICs and network processors to perform the filtering functions. Another advantage of this circuitry is that it reduces the amount of components to achieve filtering and therefore can yield simpler systems with an increased mean time between failures (assuming similar distribution of failures rates among the components).

An Exemplary 1 Gbps Implementation

The above design may be used to encode the signatures provided by Snort, a popular open-source IDS system. Such an encoding may be translated into a HDL format suitable for automatic synthesis into FPGA circuits.

In one embodiment, for a 1 Gbps implementation, the word size is 16. This means that raw Ethernet data is latched into the FPGA at 62.5 Mhz (1 GHz/16). The 16-bit decomposition results in a fairly compact design that allows the matching of approximately 1200 Snort signatures with a single 4-million-gate XILINX FPGA.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

I claim:

1. A method comprising: a processor and a memory for performing the steps of
   broadcasting data units of packets to a plurality of finite state machine (FSM) comparison units, each of the FSM comparison units implementing a portion of a signature;
   comparing the data units of the packets to a plurality of signatures, including each FSM comparison unit of the plurality of FSM comparison units independently and concurrently comparing one of the data units to the corresponding portion of a signature implemented by said each of the FSM comparison units; and
   combining results of the plurality of FSM comparison units independently processing the data units using a logic combinatorial circuit wherein combining results comprises logically ANDing results from a subset of the plurality of FSM comparison units, each FSM in the plurality matching a portion of a first signature from the plurality of signatures, and translating information on the match of the first signature into one or more values.

2. The method defined in claim 1 wherein one FSM comparison unit of the plurality of FSM comparison units implement a single portion of a signature that forms a portion of two signatures of the plurality of signatures.

3. The method defined in claim 2 wherein a set of the plurality of FSM comparison units implement one signature, and comparing the data units of the packets to the plurality of signatures comprises performing unanchored string matching by comparing the data units of the packets to the one signature.

4. The method defined in claim 2 wherein a set of the plurality FSM comparison units implement one signature, and comparing the data units of the packets to the plurality of signatures comprises performing anchored string matching by comparing the data units of the packets to the one signature.

5. The method defined in claim 1 wherein the logic combinatorial circuit forms at least a portion of a reduction network.

6. The method defined in claim 1 wherein the one or more values comprises a block value and a pass value.

7. The method defined in claim 1 further comprising blocking a packet if no pass values are generated for a signature and one or more block values are generated for the signature.

8. The method defined in claim 1 further comprising forwarding a packet without blocking the packet if at least one pass value is generated for the signature.

9. The method defined in claim 1 wherein comparing the data units of the packets to a plurality of signatures comprises a processor managing comparisons by at least a group of FSM comparison units of the plurality of FSM comparison units and managing transitions of the at least one group of FSM comparison units.

10. The method defined in claim 1 wherein a group of the plurality of FSM comparison units is programmed to perform arbitrary signature matching.

11. The method defined in claim 10 wherein a set of the plurality of FSM comparison units comprise a plurality of programmable registers programmed to match a signature, and further wherein a first of the plurality of programmable registers is coupled to the output of a second of the plurality of programmable registers, and at least one of the plurality of programmable registers comprises a last register of a match of the signature.

12. An apparatus having a processor and a memory, comprising:
   a bus system to broadcast data units of a packet;
   a plurality of finite state machine (FSM) comparison units coupled to the bus system to compare the data units of the packet to a plurality of signatures, each of the FSM comparison units implementing a portion of a signature, wherein each FSM comparison unit of the plurality of FSM comparison units independently and concurrently compares one of the data units to its associated portion of one signature; and
   a logic combinatorial circuit to combine results of the plurality of FSM comparison units independently processing the data units the logical combinatorial circuit comprising a logic circuit to logically AND results from each FSM implementing a portion of a first signature from the plurality of signatures to determine if a match for the signature exists, and to translate information on the match into one or more values.

13. The apparatus defined in claim 11 wherein one FSM comparison unit of the plurality of FSM comparison units implement a portion of two signatures of the plurality of signatures.

14. The apparatus defined in claim 13 wherein a set of the plurality FSM comparison units implement one signature, and the set of FSM comparison units compares the data units of the packet to the plurality of signatures by performing unanchored string matching by comparing the data units of the packets to the one signature.

15. The apparatus defined in claim 13 wherein a set of the plurality FSM comparison units implement one signature, and the FSM comparison units compare the data units of the packet to the plurality of signatures by performing anchored string matching by comparing the data units of the packets to the one signature.

16. The apparatus defined in claim 12 wherein the logic combinatorial circuit forms at least a portion of a reduction network.

17. The apparatus defined in claim 13 wherein the one or more values comprises a block value and a pass value.

18. The apparatus defined in claim 13 wherein the network interface is operable to block the packet if no pass values are generated for a signature and one or more block values are generated for the signature.

19. The apparatus defined in claim 13 wherein the network interface is operable to forward the packet without blocking the packet if at least one pass value is generated for the signature.

20. The apparatus defined in claim 12 wherein a processor manages comparisons by at least a group of FSM comparison units of the plurality of FSM comparison units and manages transitions of the at least one group of FSM comparison units.

21. The apparatus defined in claim 12 wherein a group of the plurality of FSM comparison units is programmed to perform arbitrary signature matching.

22. The apparatus defined in claim 21 wherein a set of the plurality of FSM comparison units comprise a plurality of programmable registers programmed to match a signature, and further wherein a first of the plurality of programmable registers is coupled to the output of a second of the plurality of programmable registers, and at least one of the plurality of programmable registers comprises a last register of a match of the signature.

23. An apparatus having a processor and a memory, comprising:
  means for broadcasting data units of packets to a plurality of finite state machine (FSM) comparison units, each of the FSM comparison units implementing a portion of a signature;
  means for comparing the data units of the packets to a plurality of signatures, including each FSM comparison unit of the plurality of FSM comparison units independently and concurrently comparing one of the data units to the corresponding portion of a signature implemented by said each of the FSM comparison units; and
  means for combining results of the plurality of FSM comparison units independently processing the data units using a logic combinatorial circuit, wherein combining results comprises logically ANDing results from a subset of the plurality of FSM comparison units, each FSM in the plurality matching a portion of a first signature from the plurality of signatures, and translating information on the match of the first signature into one or more values.

* * * * *

UNITED STATES PATENT AND TRADEMARK OFFICE
CERTIFICATE OF CORRECTION

PATENT NO. : 7,584,303 B2  
APPLICATION NO. : 10/742284  
DATED : September 1, 2009  
INVENTOR(S) : Livio Ricciulli It is certified that error appears in the above-identified patent and that said Letters Patent is hereby corrected as shown below:

Title Page item 73 should read "Force 10 Networks, Inc."

Signed and Sealed this

Seventeenth Day of November, 2009

David J. Kappos  
*Director of the United States Patent and Trademark Office*